United States Patent

Nagao et al.

[11] Patent Number: 5,898,457
[45] Date of Patent: *Apr. 27, 1999

[54] TV CONFERENCE COMMUNICATION DEVICE AND METHOD OF CONTROLLING THE SAME

[75] Inventors: Seiji Nagao, Ebina; Yoshikazu Watanabe, Yokohama, both of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/352,616

[22] Filed: Dec. 9, 1994

[30] Foreign Application Priority Data

Dec. 10, 1993 [JP] Japan .................................. 5-341053

[51] Int. Cl.$^6$ .................................................. H04N 7/15
[52] U.S. Cl. ............................. 348/15; 348/17; 348/19; 348/14; 379/102.02
[58] Field of Search ................................ 379/100, 96, 93, 379/201, 102, 104, 105, 93.17, 93.21, 102.01, 102.02, 102.07; 348/13–19; 358/426

[56] References Cited

U.S. PATENT DOCUMENTS

| | | | |
|---|---|---|---|
| 5,170,427 | 12/1992 | Guichard et al. ...................... | 348/14 |
| 5,231,492 | 7/1993 | Dangi et al. ........................... | 348/17 |
| 5,389,965 | 2/1995 | Kuzma .................................. | 348/14 |
| 5,392,284 | 2/1995 | Sugiyama .............................. | 348/17 |
| 5,473,366 | 12/1995 | Imaeda et al. ......................... | 348/14 |

FOREIGN PATENT DOCUMENTS 0 498 649  8/1992  European Pat. Off. .

OTHER PUBLICATIONS

Draft Revision of Recommendation H.261, Apr. 28, 1990, "Video Codec for Audiovisual Services AT px64 kbit/s".
CCITT (ITU–T) Recommendation H.320 Set Forth in Mar., 1993, pp. 613–638.
CCITT (ITU–T) Recommendation H.261 Set Forth in Mar., 1993 pp. 569–612.
CCITT (ITU–T) Recommendation H.242 Set Forth in Mar., 1993, pp. 509–567.
CCITT (ITU–T) Recommendation H.221 Set Forth in Mar., 1993, pp. 443–489.

*Primary Examiner*—Stella Woo
*Attorney, Agent, or Firm*—Oblon, Spivak, McClelland, Maier & Neustadt, P.C.

[57] ABSTRACT

A method of controlling TV conference communication devices having exchanges of moving picture images therebetween through a network includes sending first moving-picture-image parameters from one of the TV conference communication devices to at least another one of the TV conference communication devices during the exchanges, wherein the first moving-picture-image parameters include information indicating quality of the moving picture images, and transmitting the moving picture images from the at least another one of the TV conference communication devices by using the first moving-picture-image parameters.

17 Claims, 14 Drawing Sheets

FIG.6

| FRAME \ OCTET | 1 | 2 | 3 | 4 | 5 | 6 | 7 | 8 |
|---|---|---|---|---|---|---|---|---|
| 0 | N1 | 0 | 0 | 1 | 1 | 0 | 1 | 1 |
| 1 | 0 | 1 | A | E | C1 | C2 | C3 | C4 |
| 2 | N2 | 0 | 0 | 1 | 1 | 0 | 1 | 1 |
| 3 | 0 | 1 | A | E | C1 | C2 | C3 | C4 |
| 4 | N3 | 0 | 0 | 1 | 1 | 0 | 1 | 1 |
| 5 | 1 | 1 | A | E | C1 | C2 | C3 | C4 |
| 6 | N4 | 0 | 0 | 1 | 1 | 0 | 1 | 1 |
| 7 | 0 | 1 | A | E | C1 | C2 | C3 | C4 |
| 8 | N5 | 0 | 0 | 1 | 1 | 0 | 1 | 1 |
| 9 | 1 | 1 | A | E | C1 | C2 | C3 | C4 |
| 10 | L1 | 0 | 0 | 1 | 1 | 0 | 1 | 1 |
| 11 | 1 | 1 | A | E | C1 | C2 | C3 | C4 |
| 12 | L2 | 0 | 0 | 1 | 1 | 0 | 1 | 1 |
| 13 | L3 | 1 | A | E | C1 | C2 | C3 | C4 |
| 14 | TEA | 0 | 0 | 1 | 1 | 0 | 1 | 1 |
| 15 | R | 1 | A | E | C1 | C2 | C3 | C4 |

FIG.7

| OCTET | 9 | 10 | 11 | 12 | 13 | 14 | 15 | 16 | |
|---|---|---|---|---|---|---|---|---|---|
| | b0 | b3 | b2 | b1 | b5 | b4 | b6 | b7 | (EVEN NUMBER FRAMES) |
| | p2 | p1 | p0 | p4 | p3 | p5 | p6 | p7 | (ODD NUMBER FRAMES) |

FIG.8

| OCTET 1 | OCTET 2 | ... | OCTET 80 |
|---|---|---|---|
| 1 2 3 4 5 6 7 8 | 1 2 3 4 5 6 7 8 | ... | 1 2 3 4 5 6 7 8 |

⟶ TIME

FIG.11A
| | | | |
|---|---|---|---|
| GOB | #1 | GOB | #7 |
| GOB | #2 | GOB | #8 |
| GOB | #3 | GOB | #9 |
| GOB | #4 | GOB | #10 |
| GOB | #5 | GOB | #11 |
| GOB | #6 | GOB | #12 |
ONE PICTURE FRAME
FIG.11B
GOB
| #1 | #2 | #3 | #4 | #5 | #6 | #7 | #8 | #9 | #10 | #11 |
|---|---|---|---|---|---|---|---|---|---|---|
| #12 | #13 | #14 | #15 | #16 | #17 | #18 | #19 | #20 | #21 | #22 |
| #23 | #24 | #25 | #26 | #27 | #28 | #29 | #30 | #31 | #32 | #33 |
FIG.11C
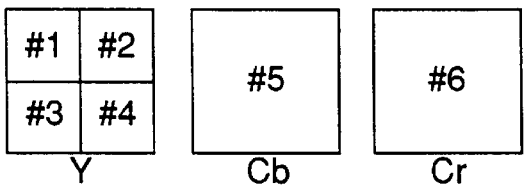
Y   Cb   Cr
FIG.11D
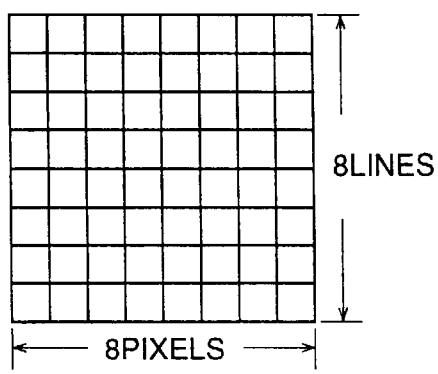
8 LINES
8 PIXELS

TV CONFERENCE COMMUNICATION DEVICE AND METHOD OF CONTROLLING THE SAME

BACKGROUND OF THE INVENTION

1. Field of the Invention

The present invention generally relates to communication devices and methods of controlling such devices, and more particularly relates to a TV conference communication device and a method of controlling such a device using the ISDN (integrated services digital network) as a transmission line.

2. Description of the Prior Art

TV conference communication devices with functions defined in the CCITT recommendation H.320, the disclosure of which is hereby incorporated by reference, are expected to be used for holding conferences with remote sites by sending and receiving data of images and of voices through transmission lines. Since such TV conference communication devices are regarded as an important and viable application area of the ISDN, their commercial use, though at its early stage of development, is on an increase.

In the TV conference communication devices of the prior art, however, image quality of moving picture images, which is set at the beginning of a TV conference communication session, is kept unchanged throughout that session. Thus, for example, when body actions of participants become more rapid during the session, images observed at the remote sites cannot show those body actions with a satisfactory clarity. Also, even if one wishes to see the participants on the other side more clearly, image quality satisfying that need cannot be obtained in the prior art.

Accordingly, there is a need in the field of TV conference communication devices for a TV conference communication device and a method of controlling such a device which can change image quality of moving picture images during a session of TV conference communication.

SUMMARY OF THE INVENTION

Accordingly, it is a general object of the present invention to provide a TV conference communication device and a method of controlling such a device which can satisfy the need described above.

Also, it is another and more specific object of the present invention to provide a TV conference communication device and a method of controlling such a device which can change image quality of moving picture images during a session of TV conference communication.

In order to achieve the above objects, according to the present invention, a method of controlling TV conference communication devices having exchanges of moving picture images therebetween through a network includes sending first moving-picture-image parameters from one of the TV conference communication devices to at least another one of the TV conference communication devices during the exchanges, wherein the first moving-picture-image parameters include information indicating quality of the moving picture images, and transmitting the moving picture images from the at least another one of the TV conference communication devices by using the first moving-picture-image parameters.

In order to achieve the above objects, according to the present invention, a TV conference communication device having exchanges of first moving picture images and second moving picture images with at least one of other TV conference communication devices includes an image pickup device picking up the first moving picture images regarding first participants at a site of the TV conference communication device, a monitor system showing the second moving picture images regarding second participants at a site of the at least one of other TV conference communication devices, an input device receiving an instruction during the exchanges from the first participants with regard to image quality of the second moving picture images, and a control device sending first moving-picture-image parameters to the at least one of other TV conference communication devices, wherein the first moving-picture-image parameters define the image quality so that the at least one of other TV conference communication devices can send the second moving picture images with the image quality.

In the method and the device described above, a user of the TV conference communication device can request a necessary image quality with regard to moving picture images sent from remote sites by sending moving-picture-image parameters corresponding to the necessary image quality. Thus, the user can obtain moving picture images from the remote site with a desired image quality. Also, the moving-picture-image parameters are sent by using a function of the multi-byte extension message process, which can be used in a transmission control procedure. This means that the TV conference communication device does not need an additional and special function for the transmission control procedure, and, thus, can be manufactured at a low cost.

Other objects and further features of the present invention will be apparent from the following detailed description when read in conjunction with the accompanying drawings.

BRIEF DESCRIPTION OF THE DRAWINGS

FIG. 6 is an illustrative drawing showing contents of an FAS of FIG. 5;

FIG. 7 is an illustrative drawing showing contents of a BAS of FIG. 5;

FIG. 8 is an illustrative drawing showing the order in which each bit constituting the frame of FIG. 4 and FIG. 5 is transmitted;

FIGS. 11A to 11D are illustrative drawings showing a hierarchical structure of moving-picture-image information;

DESCRIPTION OF THE PREFERRED EMBODIMENTS

In the following, a description will be given of embodiments of the present invention with reference to the accompanying drawings.

Figure 1:
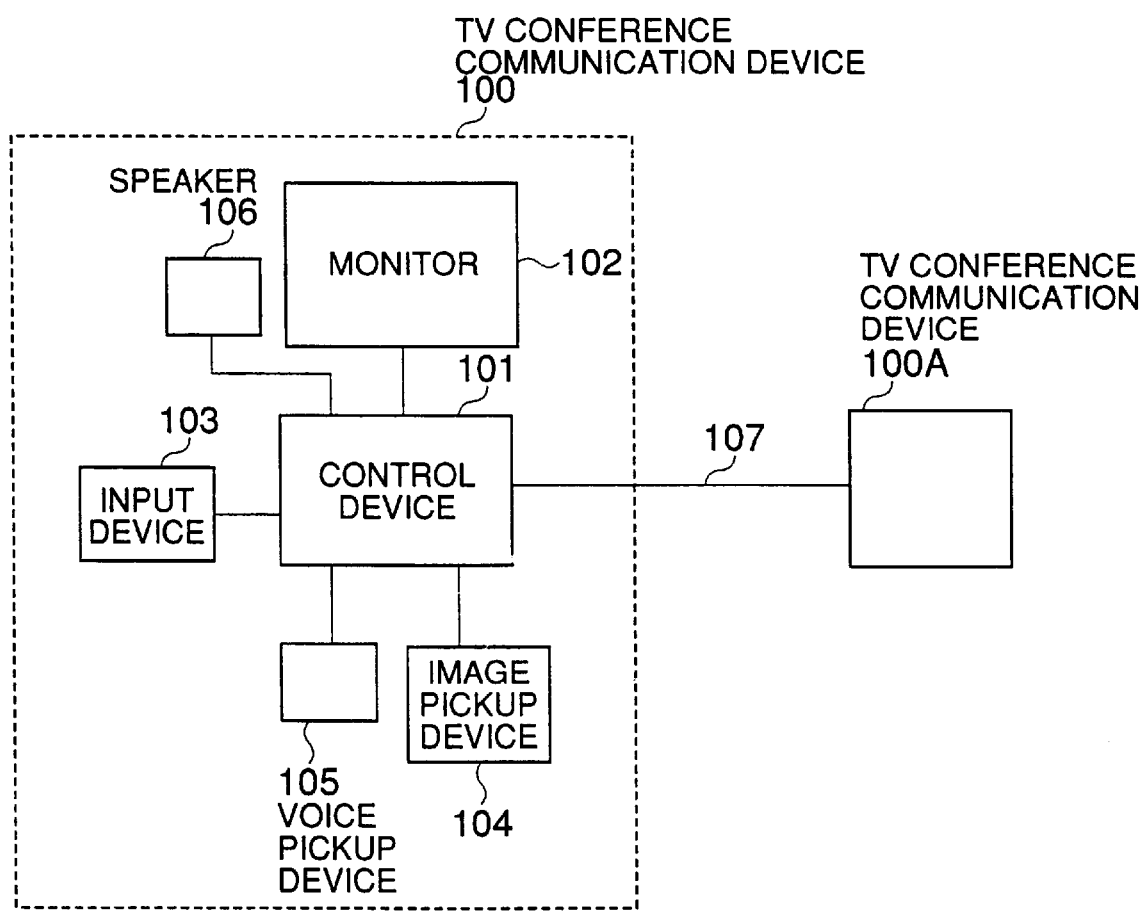
FIG. 1 is a block diagram showing a principle of the present invention.

FIG. 1 shows a principle of a TV conference communication device 100 according to the present invention.

In FIG. 1, the TV conference communication device 100 includes a control device 101, a monitor 102, an input device 103, an image pickup device 104, a voice pickup device 105, and a speaker 106. The TV conference communication device 100 is connected to at least one TV conference communication device 100A through the ISDN 107.

The image pickup device 104 picks up images of participants of a TV conference at a local site. The control device 101 sends moving-picture-image data to the TV conference communication device 100A by using predetermined moving-picture-image parameters, which include such parameters as quantization threshold value and a frame rate of the moving picture images. The control device 101 also receives moving-picture-image data transmitted from a remote site, i.e., the TV conference communication device 100A. The moving-picture-image data transmitted from the remote site is shown on the monitor 102, showing video images of participants at the remote site. The transmission of the moving-picture-image data from the remote site is also in accordance with the moving-picture-image parameters.

The participants at the local site can change image quality of the moving picture images they are seeing on the monitor 102 by changing the moving-picture-image parameters. This change can be made through an operation on the input device 103. According to the change requested by the participants, the control unit changes the moving-picture-image parameters for the moving-picture-image data transmitted from the remote site to the local site, and/or the moving-picture-image parameters for the moving-picture-image data transmitted from the local site to the remote site. When changing the moving-picture-image parameters with regard to transmission from the remote site, the control device 101 sends an extension command to the TV conference communication device 100A. Then, the TV conference communication device 100A changes the moving-picture-image parameters as requested by the extension command.

All of the processes described above regarding the change of the moving-picture-image parameters can be carried out during an on-going TV conference session. Thus, the participants at both sites can expect to conduct the TV conference session more smoothly than in the case of using TV conference communication devices of the prior art.

Figure 2:
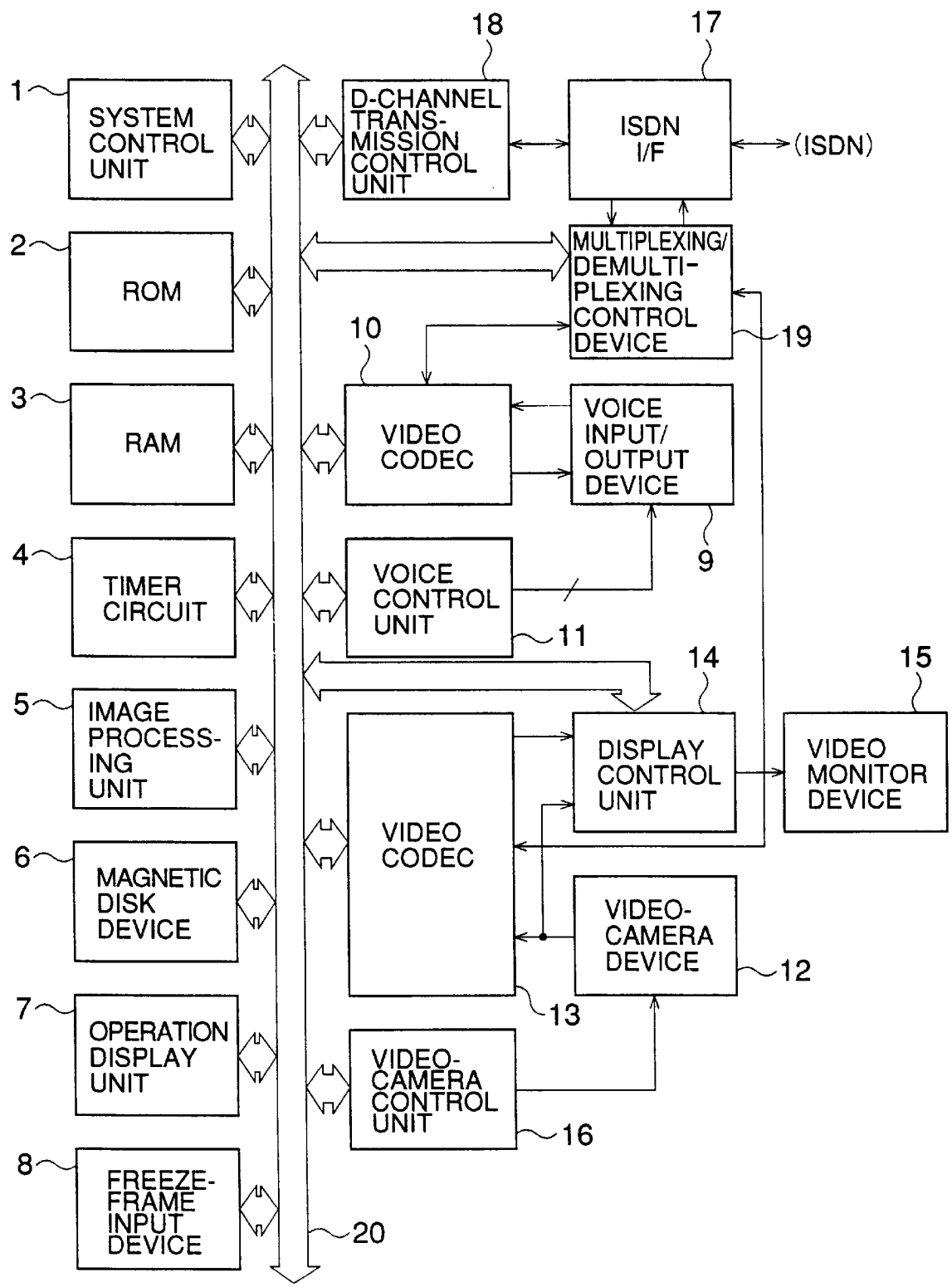
FIG. 2 is a block diagram of an embodiment of the present invention.

FIG. 2 shows an embodiment of a TV conference communication device according to the present invention. The TV conference communication device shown here has TV conference communication functions defined in the CCITT recommendation H.320, and uses the ISDN as transmission lines.

In FIG. 2, a system control unit 1 is provided for carrying out the control of each part of the TV conference communication device and the processing of TV conference communication control procedures on information channels (the B channel). A ROM 2 is provided for storing part of control process programs for the system control unit 1 and various data used in the execution of those programs. A RAM (random access memory) 3 is provided for providing work areas for the system control unit 1.

A timer circuit 4 outputs current time information. An image processing unit 5 carries out various image processes necessary for the functions of the TV conference communication device, such processes including reducing/enlarging the size of images, freezing moving picture images, coding/encoding a freeze-frame by the JPEG (joint photographic image coding experts group) method, and various statistical analyses of images.

A magnetic disk device 6 is provided for storing control programs for the system control unit 1, application programs, and other various data. An operation/display unit 7 is provided for enabling operations on the TV conference communication device. A freeze-frame input device 8 is provided for inputting a freeze-frame, and includes a still-camera device and so forth.

A voice input/output device 9 exchanges voice information with other terminals so as to enable verbal communications between users. A voice CODEC (coder/decoder) 10 converts analog voice signals from the voice input/output device 9 into digital voice data, and converts received digital voice data into analog voice signals to supply to the voice input/output device 9. A voice control unit 11 is provided for controlling the voice input/output device 9.

A video-camera device 12 picks up images of participants on the side of this TV conference communication device. A video CODEC 13 converts NTSC video signals from the video-camera device 12 into digital video data, converts the digital video data into video data in a predetermined form such as the CIF (common intermediate format) or the QCIF (quarter intermediate format), and encodes the video data into a compressed form by using an encoding method according to the CCITT recommendation H.261 (the disclosure of which is hereby incorporated by reference) so as to generate video information. The video CODEC 13 also converts video information in the compressed form into video data in the CIF or the QCIF, converts that video data into an analog video signal, and converts the analog video signal into an NTSC video signal.

Video signals created through conversion in the video CODEC 13 is provided for a display control unit 14. Video signals from the video-camera device 12 is also provided for the display control unit 14. The display control unit 14 controls images displayed on a video monitor device 15. A video-camera control unit 16 controls camera angles of the video-camera device 12.

An ISDN interface control unit 17 connects the TV conference communication device with the ISDN. The ISDN interface control unit 17 is equipped with signal processing functions of the layer 1 and integration/disintegration functions for signals on the D channel (signal channel) and the two B channels (information channels).

A D channel transmission control unit 18 is equipped with functions of call control procedures carried out on the signal channel and equipped with multi-call control functions. A multiplexing/demultiplexing control device 19 is equipped with data-multiplexing/demultiplexing functions in accordance with the CCITT recommendation H.221 (the disclosure of which is hereby incorporated by reference), and with functions of data-frame synchronizing. Digital voice data, digital video data, and other data are supplied to connection nodes on the demultiplexing side of the multiplexing/demultiplexing control device. Connection nodes on the multiplexing side thereof are connected to the ISDN interface control unit 17.

To a system bus 20 are connected the system control unit 1, the ROM 2, the RAM 3, the timer circuit 4, the image processing unit 5, the magnetic disk device 6, the operation display unit 7, the freeze-frame input device 8, the voice CODEC 10, the voice control unit 11, the video CODEC 13, the display control unit 14, the video-camera control unit 16, the D channel transmission control unit 18, and the multiplexing/demultiplexing device 19. Data exchange between those units is carried out through the system bus 20.

Also, there is voice-data exchange between the multiplexing/demultiplexing device 19 and the voice CODEC 10, and video-data exchange between the multiplexing/demultiplexing device 19 and the video CODEC 13.

Figure 3:
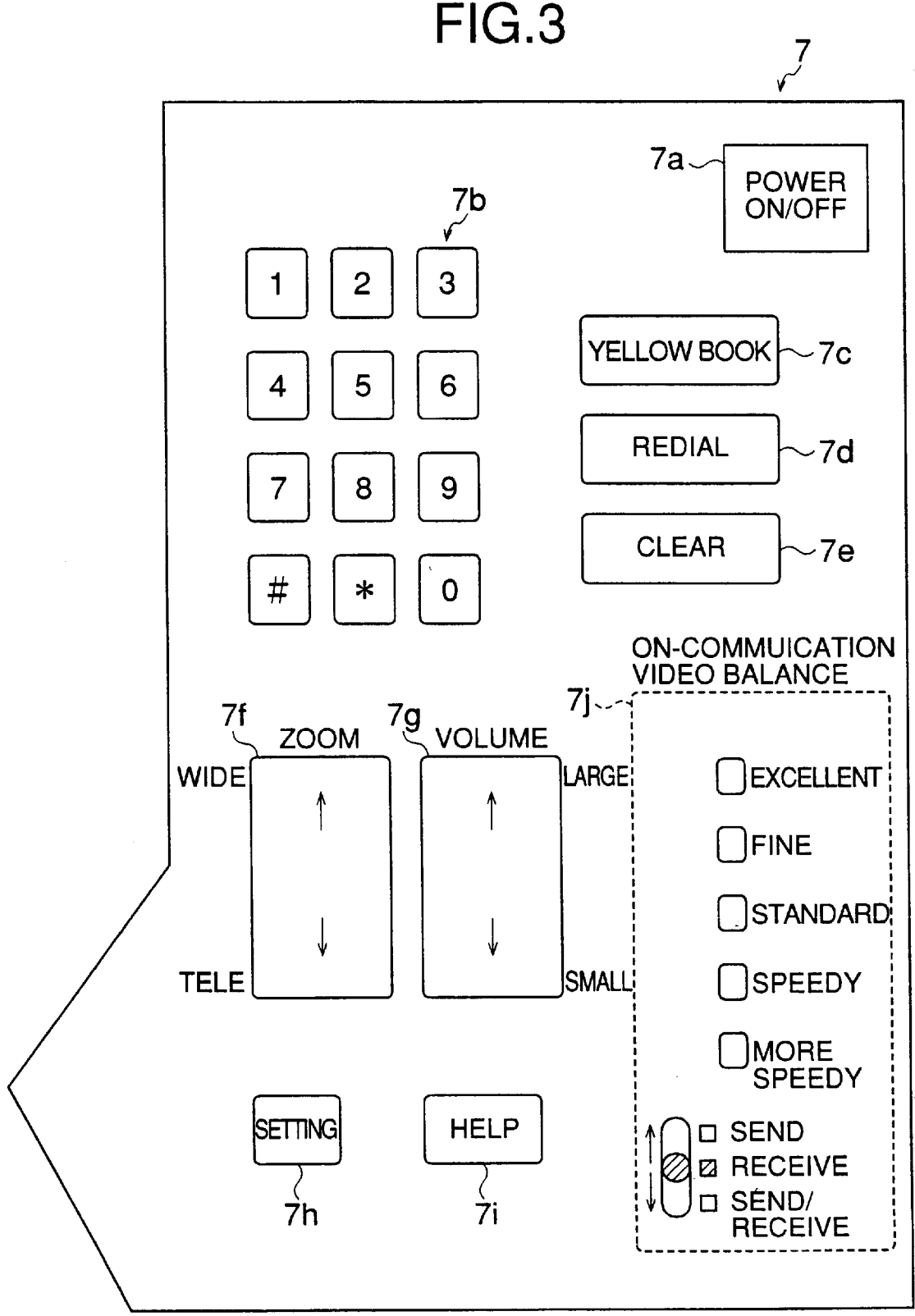
FIG. 3 is an illustrative drawing showing an operation display unit of FIG. 2.

FIG. 3 shows an embodiment of operation keys provided on the operation/display unit 7.

In FIG. 3, a power key 7a is provided for turning the power on/off of the TV conference communication device. A key-pad 7b is provided for inputting numbers representing information such as telephone numbers (ISDN numbers). A yellow-book key 7c is provided for using predetermined yellow-book functions. A re-dialing key 7d is provided for calling a terminal again to which a call has been made immediately before. A clear key 7e is used for clearing a memory, for example, which stores a number which has been entered immediately before through an operation on the key-pad 7b.

A zoom key 7f is used for zooming in or zooming out the camera view of the video-camera device 12 of the remote terminal. A volume key 7g is provided for adjusting the speaker volume of the TV conference communication device.

A setting key 7h is provided for calling up functions of changing various settings for the TV conference communication device. A help key 7i is for displaying an explanatory display for the operations (i.e., an operation guide and an operation help manual).

An on-communication video balance operation unit 7j is provided for manipulating image quality and motion responsiveness of both moving picture images picked up by the TV conference communication device and moving picture images picked up on the remote side during a TV conference communication session. The image quality and the motion responsiveness are hereinafter called a video balance. The manipulation of the video balance through operations on the on-communication video balance operation unit 7j is part of the novelty of the present invention. As will be described later in detail, the present invention allows participants of a TV conference to change a video balance of the moving picture images during an on-going TV conference session.

Degrees of the video balance include 'standard' for an average level of image quality and motion responsiveness, 'fine' for a better image quality, 'excellent' for a further better image quality, 'speedy' for a better motion responsiveness than 'standard', and 'more speedy' for a further better motion responsiveness. Those five video balances can be selected through a selection of one of the keys provided on the on-communication video balance operation unit 7j. Also, a selection switch is provided at the bottom left on the on-communication video balance operation unit 7j. The selection switch is used for indicating which direction of data transmission is subject to a change of a video balance requested by a participant. For example, if a participant wishes to set a video balance to 'speedy' for moving picture images the participant is seeing, the participant selects a key indicating 'speedy' after positioning the selection switch to a receive position. Then, moving picture images which are transmitted from a remote site to the site of the participant can change their video balance so as to show better motion responsiveness.

On the B channel, the TV conference communication device exchanges data in the form of a multiframe method as defined in the CCITT recommendation H.221.

Figure 4:
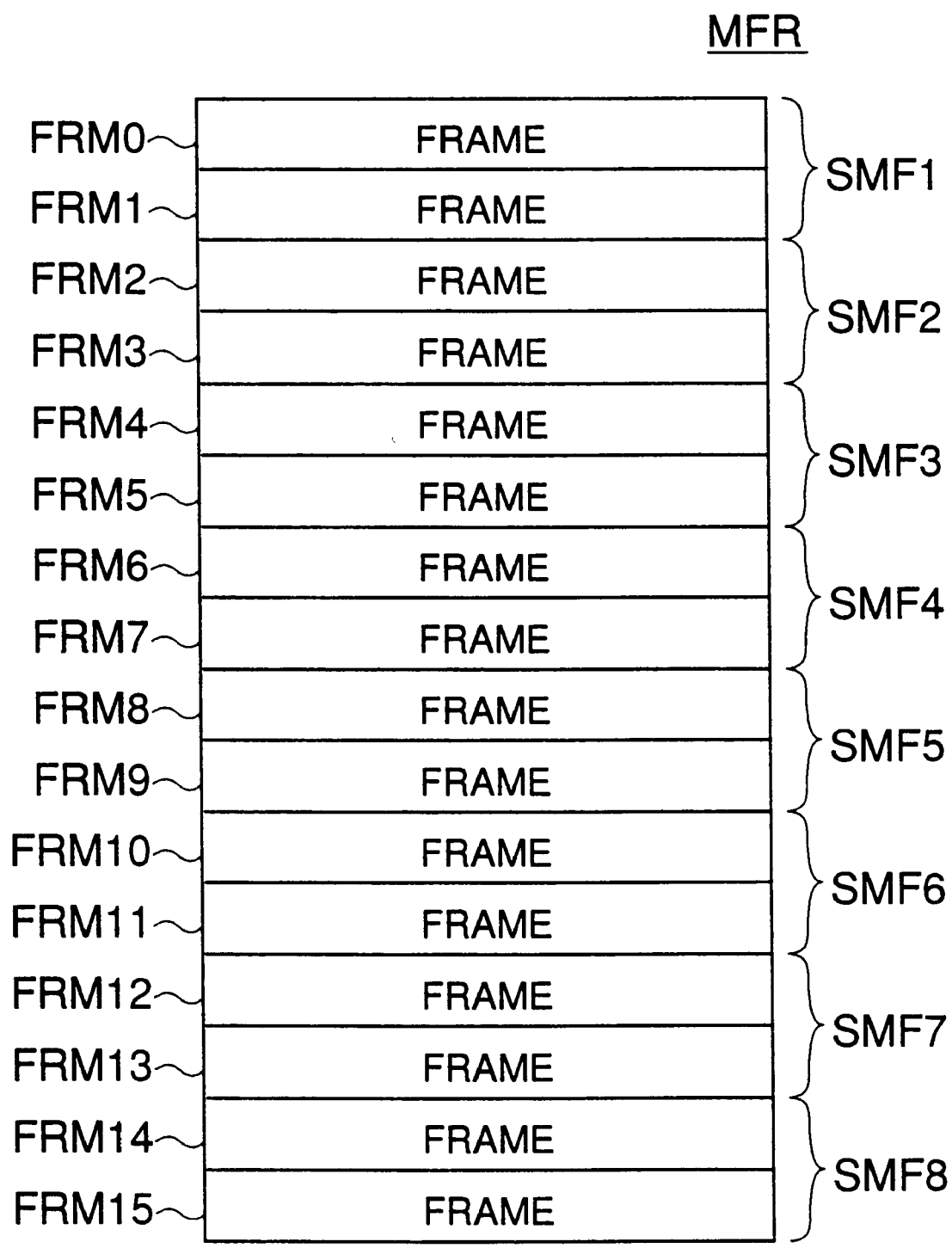
FIG. 4 is an illustrative drawing showing a configuration of a multiframe.

As shown in FIG. 4, one multiframe MFR includes eight sub-multiframes SMF1 through SMF8. Each of the sub-multiframes SMF1 to SMF8 includes two frames. Namely, the multiframe MFR includes 16 frames FRM0 through FRM15.

Figure 5:
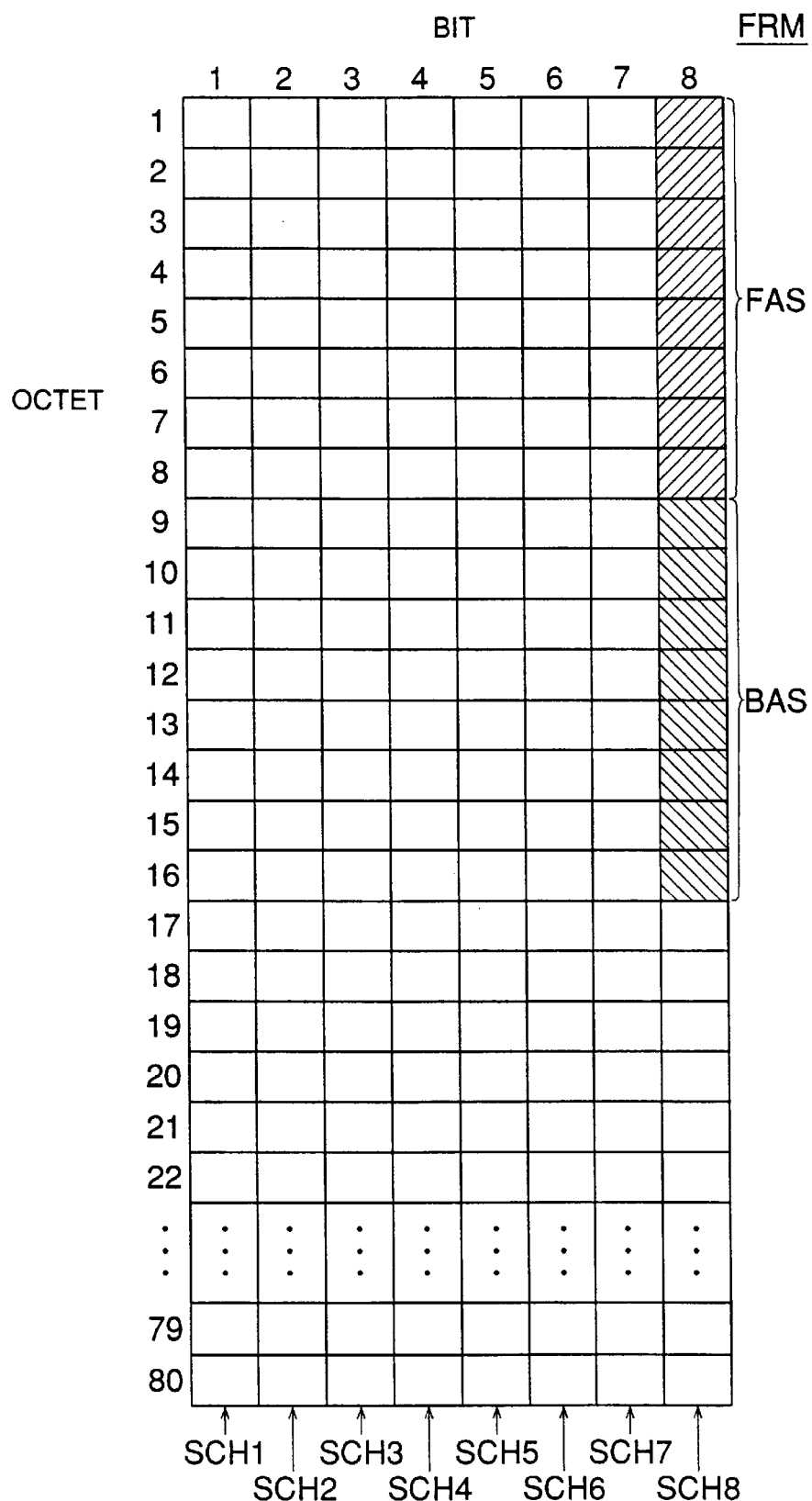
FIG. 5 is an illustrative drawing showing a configuration of one of frames of FIG. 4.

As shown in FIG. 5, each of the frames FRM0 to FRM15 is comprised of data of 80 octets. The bits of each octet are arranged in a bit order, and constitute sub-channels SCH1 to SCH8.

The eighth bits of the first octet through the eighth octet make up a frame-alignment signal FAS, and the eighth bits of the ninth octet through the sixteenth octet make up a bit-rate allocation signal BAS. As an option, eighth bits of the seventeenth octet to the eightieth octet may partly include data on a cryptographic channel which can be used for exchanging key information for enciphering data.

In this manner, the frame-alignment signal FAS having eight bits is provided for all the frames FRM0 to FRM15. Each bit of the frame-alignment signal FAS is arranged such that one multiframe MFR constitutes one FAS bit arrangement unit, as shown in FIG. 6.

As shown in FIG. 6, a vertical synchronize signal comprised of the six bits '001011' is arranged in the first octets of the odd number frames FRM1, FRM3, . . . , FRM11. A horizontal synchronize signal comprised of the eight bits '00110111' is arranged in the second octet to the eighth octets of the even number frames FRM0, FRM2, . . . , FRM14 and the second octets of the odd number frames.

By extracting the horizontal synchronize signal and vertical synchronize signal, one multiframe MFR can be synchronized.

N1 through N5 arranged in the first octets of the frames FRM0, FRM2, FRM4, FRM6, and FRM 8 are used for showing a multiframe number. Among them, bit N5 is used for showing whether or not the multiframe number is used. Thus, the data used for representing the multiframe number is comprised of 4 bits. The multiframe number counts down from 15 to 0 in a descending order, so that the same multiframe number appears in the cycle of 16 multiframes.

L1, L2, and L3 of the first octets of the frames FRM10, FRM12, and FRM13 are used for showing a connection number, which expresses an information channel carrying the pertinent multiframe. Here, connection numbers are assigned to information channels currently used by numbering them according to the order in which they are connected. A bit R of the first octet of the frame FRM15 is reserved for a future extension based on CCITT recommendations, and is normally set to 0.

A bit TEA of the first octet of the frame FRM14 is used for showing the fact that data transmission cannot be made because of malfunction inside the data terminal device.

A bit A of the third octets of the odd number frames FRM1, FRM3, ..., FRM15 are used for showing whether frames or a multiframe are kept in synchronization.

Bits C1, C2, C3, and C4 arranged in the fifth octets to the eighth octets of the odd number frames FRM1, FRM3, ..., FRM15 are used for showing CRC (cyclic redundancy check), which is used for detecting data error (i.e., transmission-line quality detection) for two consecutive frames (i.e., one sub-multiframe). A bit E of the fourth octet of the odd number frames are used for showing the fact that there is a transmission error on the caller side, so that the existence of the error can be known to the receiver side.

As shown in FIG. 7, the bit-rate allocation signal BAS for the even number frames is comprised of 8-bit data representing capability BAS or BAS commands. For each odd number frame following each even number frame, dual error-correction codes are provided as the bit-rate allocation signal BAS, and are used for correcting errors of a capability BAS or a BAS command transmitted in a previous frame.

The data transmission of the multiframe MFR is carried out in the order of frame numbers. As shown in FIG. 8, each of the frames FRM0 to FRM15 is transmitted by sending out each octet in the order of octet numbers, i.e., the first octet first and the eightieth octet last. In each octet, the first bit is transmitted first, as shown in FIG. 8.

Thus, for each of the frames FRM0 to FRM15, the first bit of the first octet is transmitted first, and the eighth bit of the eightieth octet last.

Figure 9:
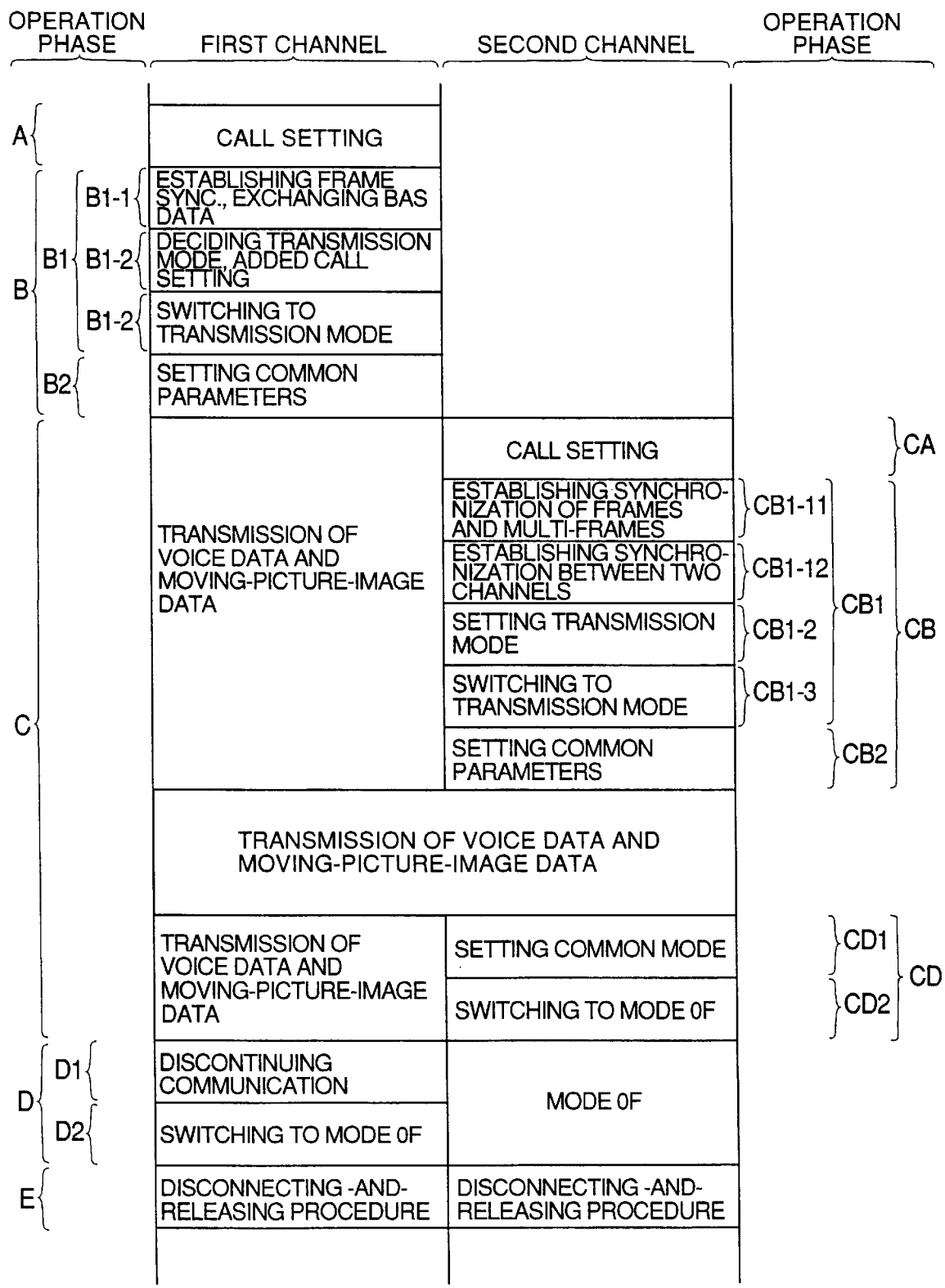
FIG. 9 is an illustrative drawing showing a procedure of establishing two information channels.

In the TV conference communication device, data is normally transmitted by using two information channels. An example of a relevant transmission procedure is shown in FIG. 9. This example of the transmission procedure is in accordance with the CCITT recommendations H.242 (the disclosure of which is hereby incorporated by reference) and H.320.

In FIG. 9, first, a caller terminal calls a receiver terminal, and carries out a call-setting procedure on the signal channel. Namely, one information channel (called the first channel hereinafter) is set aside (phase A) for use as a transmission line. Then, frame synchronization is established (frame mode) by exchanging frame data containing PCM voice data (64 kpbs by the A law or the μ law) on the first channel. When the frame synchronization is established, capability BAS data and command BAS data are exchanged between the two terminals (phase B1-1). Then, a transmission mode to be used is decided, and making an added call setting request is started in order to set aside a second information channel (phase B1-2).

The transmission mode with the functions of the highest level shared by both terminals is selected based on the data exchanged between those terminals (phase B1-3). Then, a BAS command for directing that the receiver terminal should operate in the selected transmission mode is sent from the caller terminal, and parameters of terminal functions common in both the caller terminal and the receiver terminal are set (phase B2). As a result, the transmission of voice data (16 kbps) and moving-picture-image data (46.4 kbps) is carried out on the first channel according to the selected transmission mode (phase C).

When the first channel starts the data transmission by using the frame mode, a call-setting procedure for the second channel is carried out on the signal channel (phase CA). When the second channel is established, frame data containing only the frame alignment signal FAS and the bit allocation signal BAS is exchanged so that frame synchronization and multiframe synchronization are established (phase CB1-11). Then, synchronization between the first channel and the second channel is established (phase CB1-12).

After the synchronization between the two channels is established, the caller terminal sends a BAS command so as to set a transmission mode (phase CB1-2). Then, a transmission mode is switched to the mode thus set (CB1-3), and common parameters are set (phase CB2).

Figure 10B:
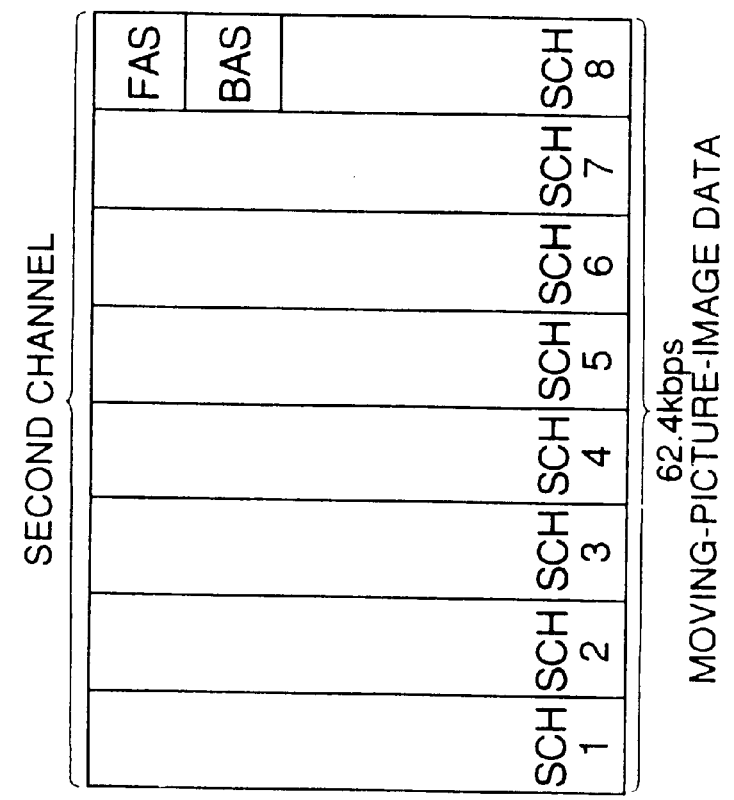
FIG. 10 is an illustrative drawing showing voice data and moving-picture-image data transmitted on the two information channels.
Figure 10A:
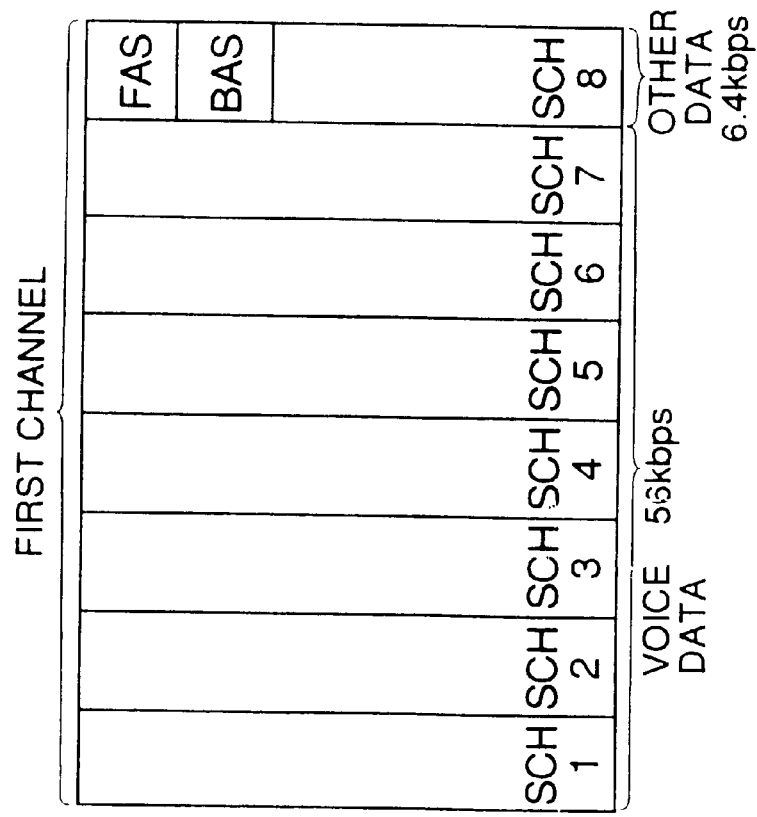

After the second channel is finished to be initialized as described above, data transmission is carried out. Namely, for example, voice data, moving-picture-image data, and other data are transmitted to with the transmission rates of 56 kbps, 62.4 kbps, and 6.4 kbps, respectively. At those transmission rates, the voice data and the other data are transmitted through the first channel, and the image data is transmitted through the second channel, as shown in FIG. 10. Here, frame data exchanged on the first channel is in synchronism with frame data exchanged on the second channel.

When terminating the data transmission, the second channel is severed first. In order to transmit the image data as well as the voice data on the first channel, a procedure for setting a common mode is carried out (phase CD1), and the second channel is switched to a mode 0F of the frame mode (phase CD2). At this point of time, the first channel and the second channel are not in synchronism. Also, the call is retained on the second channel with the transmission of only the frame alignment signal FAS and the bit allocation signal BAS. In this condition, the call on the second channel can be released by carrying out a call disconnecting-and-releasing procedure for the signal channel.

On the first channel during the phases CD1 and CD2, voice data and moving-picture-image data are transmitted, for example, at the transmission rate of 62.4 kbps in total by using the frame mode. When an operator of a terminal on one side discontinues communication, the transmission of the moving picture image data is terminated. The first channel is switched to the mode 0F in order to direct all the transmission capacity of the first channel to the voice transmission (phase D2). After this, the first channel is in such a condition that its call can be released by carrying out the call disconnecting-and-releasing procedure for the signal channel.

Then, the call disconnecting-and-releasing procedure is carried out on the signal channel with regard to the first and second channels, so that the TV conference communication is finished between the two terminals.

As described above, in the TV conference communication device, one information channel (the first information channel) is first set aside, and the frame mode is established. Then, while data transmission is being temporarily performed after the transmission rates for voice data and moving-picture-image data are assigned for the first channel, the second information channel is set aside if possible. This setting aside is done by carrying out the call setting procedure for the signal channel. Then, the first channel operating in the temporary transmission mode and the second channel are synchronized with each other. When the synchronization is established, the transmission rates are reallocated for the voice data and the moving-picture-image data. In order to fully utilize the increased transmission capacity on the information channels, a coding method for the voice data and the moving-picture-image data is changed so as to carry out a data transmission of higher quality.

When the data transmission is terminated, a shift is made from the mode, in which both the first channel and the second channel are used, to the mode in which only the first channel is used. First, the coding method for the voice data and the moving picture image data is set to that which is best suited to the use of the transmission capacity of 62.4 kbps on the first channel. Also, the second channel is taken out of synchronization with the first channel, and is switched to the mode 0F in which the transmission of user data is absent. Furthermore, the call on the second channel is disconnected and released by carrying out the call disconnecting-and-releasing procedure for the signal channel. The first channel is switched from a media transmission of two types of data transmissions, i.e., the voice data and moving-picture-image data, to the mode 0F in which only the voice data is transmitted. Then, the call on the first channel is disconnected and released by carrying out the call disconnecting-and-releasing procedure for the signal channel. Here, the first channel may not be switched from the mode in which both the first and second channels are used, to the mode where only the first channel is used, to best utilize the transmission capacity of 62.4 kbps thereof. Instead, the first channel may be switched directly to the mode 0F, and be disconnected and released. Information on account fees and the like, which is obtained during the call disconnecting-and-releasing procedure, is recorded and managed separately for each channel.

In the TV conference communication functions defined in the CCITT recommendation H.320, a moving-picture-image coding method according to the CCITT recommendation H.261 is used as a coding method of the video CODEC 13. The moving-picture-image coding method of the CCITT recommendation H.261 will be explained below. Although there are two different formats for representing moving-picture-image information, i.e., the CIF and the QCIF, a description will be given with regard to only the CIF.

The CIF (common intermediate format), which is a basis of moving-picture-image formatting, displays 29.97 frames of images per second, and has one frame of luminance components (Y) comprised of 288 lines each with 360 pixels, and two frames of color difference components (Cb, Cr) each comprised of 144 lines with 180 pixels.

As shown in FIG. 11A, each of those frames is divided into 12 GOBs (group of blocks), each of which is further divided into 33 (11×3) macro blocks as shown in FIG. 11B.

As shown in FIG. 11C, each of the macro blocks is divided into 4 (2×2) blocks for the luminance components, but each of the macro blocks is treated as one block for the color components. Since one frame of the luminance components has twice the lines and pixels of that of color components, one block ends up being comprised of 8 pixels by 8 lines for both the luminance components and the color components, as shown in FIG. 11D.

Moving-picture-image information corresponds to the hierarchical structure of frame/GOB/macro block/block as described above, and an example of the format of moving-picture-image information is shown in FIGS. 12A to 12D. A description which will be given below is in accordance with the TTC standard JT-H261, which is a Japanese national standard corresponding to the CCITT recommendation H.261.

Figure 12A:
FIGS. 12A to 12D are illustrative drawings showing a format of moving-picture-image information.

As shown in FIG. 12A, one frame of moving-picture-image information includes a PSC comprised of 20 bits of a predetermined bit pattern indicating a start point of the frame, a frame number TR representing an ordinal number of the frame, type information PTYPE representing information on the entire frame, extension-data insertion information PEI, reserved information PSPARE, and GOB data. Here, at least one extension-data insertion information PEI is always included, while there is a case in which the reserved information PSPARE is not included. The frame start code PSC, the frame number TR, the type information PTYPE, the extension-data insertion information PEI, and the reserved information PSPARE are collectively called a frame header.

Figure 12B:
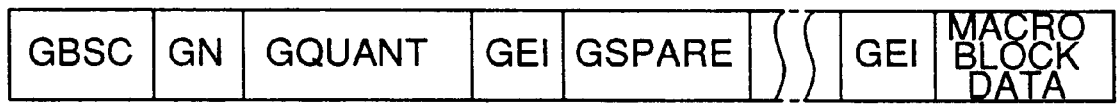

GOB data is provided for each of the GOBs. As shown in FIG. 12B, GOB data includes a GOB start code GBSC indicating a start of the GOB data, a GOB number GN indicating the position of GOB, quantization characteristic information GQUANT representing information on quantization characteristics, extension-data insertion information GEI indicating whether there is an extension data area (reserved information), reserved information GSPARE, and macro block data. Here, at least one extension-data insertion information GEI is always included, while there is a case in which the reserved information GSPARE is not included. The GOB start code GBSC, the GOB number GN, the quantization characteristic information GQUANT, the extension-data insertion information GEI, and the reserved information GSPARE are collectively called a GOB header.

Macro block data is provided for each of the macro blocks. However, if no information is included in the relevant portion of the frame, the macro block data of that portion is not transmitted.

Figure 12C:

As shown in FIG. 12C, macro block data includes a macro block address MBA representing the position of the macro block, type information MTYPE representing the type of the macro block and indicating which data elements will appear, quantization characteristic information MQUANT representing information on quantization characteristics, motion vector information MVD, a coded block pattern CBP indicating that with this macro block at least one transformation coefficient is transmitted, and block data. Here, the quantization characteristic information MQUANT, the motion vector information MVD, and the coded block pattern CBP appear according to an indication by the type information MTYPE. The macro block address MBA, the type information MTYPE, the quantization characteristic information MQUANT, the motion vector information MVD, and the coded block pattern CBP are collectively called a macro block header.

Figure 12D:

As shown in FIG. 12D, the block data includes a transformation coefficient TCOEFF representing transformation coefficient data which is obtained by performing the DCT (discrete cosine transform) on the pertinent block of the image data, and a block end code EOB indicating the end of the block.

In the moving-picture-image coding method according to the CCITT recommendation H.261, image quality of moving picture images can be changed to some extent, for example, by changing a quantization threshold within a predetermined range (even numbers ranging from 2 to 62). In this case, the quantization characteristic information GQUANT of the GOB data is set to what represents a quantization threshold which is to be applied to following GOBs. Also, the quantization characteristic information MQUANT of the macro block data is set to what represents a quantization threshold which is to be applied to following macro blocks.

In other words, the moving-picture-image coding method according to the CCITT recommendation H.261 can control the dynamic range of codes by dividing transformation coefficients obtained through the DCT applied on image data by a quantization threshold value.

A small quantization threshold value can decrease quantization errors, and can enhance image quality (i.e., to finer images) when coded moving-picture-image information is decoded. At the same time, the amount of data is increased. If the amount of data per second becomes greater than a data transmission rate of the moving-picture-image information, a transmission buffer will suffer from overflow. In order to prevent the overflow, the video CODEC 13 restricts the data amount by skipping some of the frames of the moving picture images. In this case, motion responsiveness will be decreased.

On the other hand, a large quantization threshold value increases quantization errors, and reduces image quality (i.e., to less fine images) when coded moving-picture-image information is decoded. Since the amount of data is decreased, however, motion responsiveness of the images can be enhanced.

Accordingly, when 'fine' is selected on the on-communication image balance operation unit 7j of the operation display unit 7, a quantization threshold value is made smaller than that in the case of 'standard'. When 'excellent' is selected, the quantization threshold value is made further smaller than that of 'fine'. When 'speedy' is selected, the quantization threshold value is made larger than that of 'standard'. When 'more speedy' is selected, the quantization threshold value is made further larger than that of 'speedy'.

In a TV conference communication device, a quantization threshold value is actually defined by its maximum value, below which a quantization threshold value can be adjusted according to image contents. Namely, setting a quantization threshold value actually means setting a maximum value which limits a range of a quantization threshold values. Within that range, a quantization threshold value can be adjusted by an adaptive quantization. In this manner, moving picture images can be subject to a more efficient coding process such that quantization is carried out based on image contents.

In the embodiment of the TV conference communication device according to the present invention, image quality of moving picture images can be changed during a session of the TV conference communication. This is done by modifying the transmission control procedure shown in FIG. 9.

Figure 13:
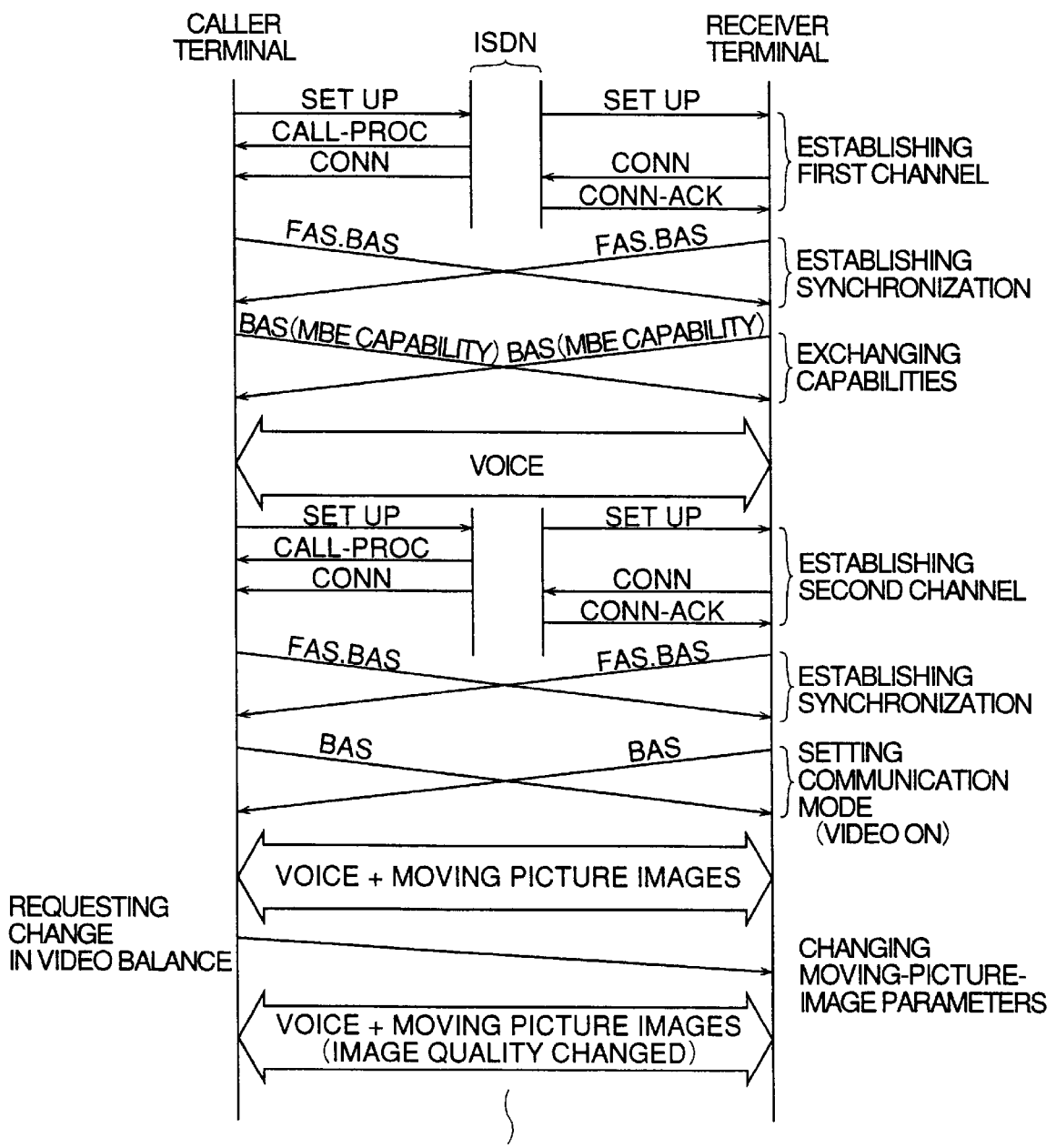
FIG. 13 is an illustrative drawing showing a procedure of establishing two information channels according to the present invention.

FIG. 13 shows an embodiment of a transmission control procedure according to the present invention.

With reference to FIG. 13, in order to establish the first channel, a caller terminal requests call setting with a receiver terminal by sending out to the ISDN a call-setting message SETUP having a destination address indicating the receiver terminal. The ISDN sends to the caller terminal a call-setting receipt message CALL_PROC used for notifying of a call-setting status, and sends the call-setting message SETUP to the receiver terminal so as to call it.

The receiver terminal sends out a response message CONN to the ISDN upon receiving the call-setting massage SETUP. The ISDN sends a response acknowledge message CONN_ACK to the receiver terminal so as to acknowledge the response of the receiver terminal. At this point of time, an information channel (B channel), i.e., the first channel, which is for the data communication between the caller terminal and the receiver terminal, is established.

Once the first channel is established as described above, frame synchronization is attempted on the first channel between the caller terminal and the receiver terminal. When the frame synchronization is established, parameters which can be set with regard to moving-picture-image information are exchanged by using the functions of the multi-byte extension message (MBE).

Figure 14A:
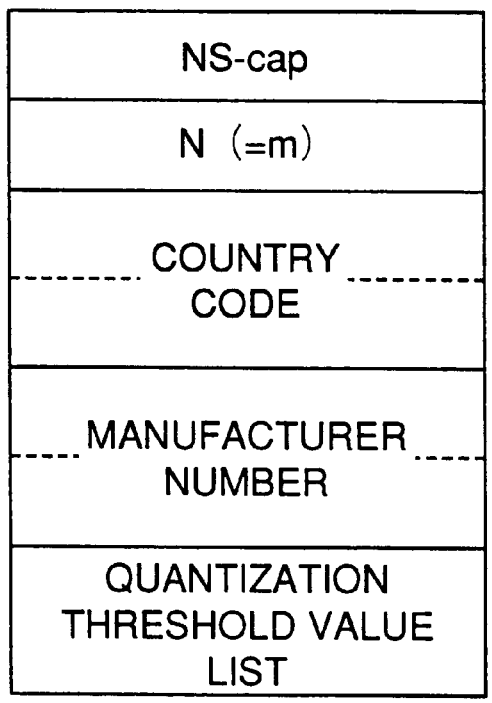
FIGS. 14A and 14B are illustrative drawings showing examples of a multi-byte extension message.

In FIG. 14A, an example of the multi-byte extension message is shown. In FIG. 14A, the multi-byte extension message includes a quantization threshold value list comprised of quantization threshold values.

NS-cap, which is the first data of the multi-byte extension message, is one-byte data indicating that this message is used for representing a non-standard function. N=m is also one-byte data indicating that the following data consists of m bytes. A country code is two-byte data representing in a predetermined manner a country in which the pertinent TV conference communication device is installed. A manufacturer number, which is two-byte data, expresses the manufacturer of this TV conference communication device in a predetermined manner. The manufacturer number is usually used for checking compatibility between different terminals with regard to terminal functions (especially, with regard to non-standard functions).

Then, in order to establish a second channel, the caller terminal requests call-setting with the receiver terminal by sending to the ISDN a call-setting message SETUP specifying the receiver terminal as a destination address. The ISDN sends to the caller terminal a call-setting receipt message CALL_PROC, and, also, sends the call-setting message SETUP to the receiver terminal.

The receiver terminal sends out a response message CONN to the ISDN upon receiving the call-setting massage SETUP. The ISDN sends a response acknowledge message CONN_ACK to the receiver terminal so as to acknowledge the response of the receiver terminal. At this point of time, an information channel (B channel), i.e., the second channel, which is for the data communication between the caller terminal and the receiver terminal, is established.

Once the second channel is established as described above, frame synchronization is attempted on the second channel between the caller terminal and the receiver terminal. When the frame synchronization is established, the first channel and the second channel are made in synchronization with each other.

After both channels are synchronized, the caller terminal sends a BAS command so as to set a communication mode. In this case, a BAS command indicating 'video on' is used. As a result, voice data and video data are exchanged between the caller terminal and the receiver terminal, and a session of TV conference communications in a basic manner can be started.

Figure 14B:
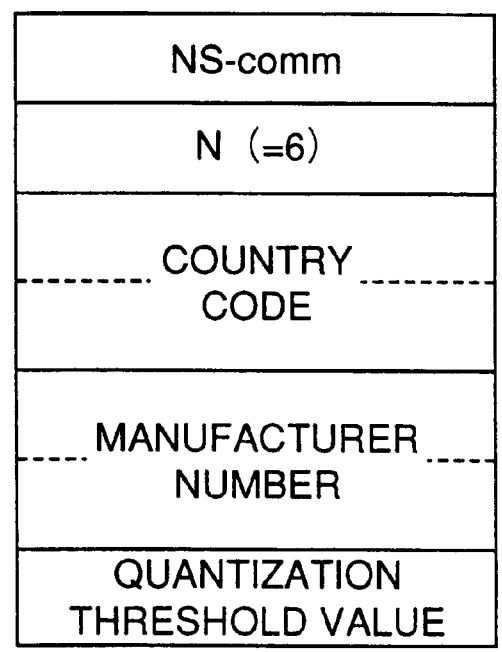

Suppose that a user of the caller terminal requests a change in the video balance of moving picture image information through an operation on the on-communication video balance operation unit 7j of the operation display unit 7, while the TV conference communication session is ongoing through an exchange of the voice data and the video data. The caller terminal sends a BAS command as shown in FIG. 14B, for example, in order to set a quantization threshold value for the receiver terminal. Here, NS-comm, which is the first data of the BAS command, is one-byte data indicating that this message is used for representing a non-standard function. N=6 is also one-byte data indicating that the following data consists of 6 bytes. A country code is two-byte data representing in a predetermined manner a country in which the caller terminal is installed. A manufacturer number, which is two-byte data, expresses the manufacturer of this caller terminal in a predetermined manner.

Upon receiving the BAS command from the caller terminal, the receiver terminal sets the received quantization threshold value in the coding part (for transmission) of the video CODEC 13. Thus, the receiver terminal can send moving-picture-image information whose image quality has been changed so as to match the video balance indicated by the user of the caller terminal.

The video CODEC 13 of the caller terminal performs a decoding process in a dynamic manner according to moving-picture-image information received from the receiver terminal. Thus, appropriate video images for the moving-picture-image information can be displayed on the video monitor device 15 of the caller terminal. In this manner, the user of the caller terminal can watch moving picture images with a desired video balance.

As described above, according to the embodiment of the present invention, the user of the TV conference communication device can adjust a video balance of moving picture images during a session of TV conference communication, which images are picked up by a terminal on a remote site and displayed on the user's terminal. Thus, the user can watch moving picture images appropriately adjusted to changes of situations, so that the TV conference communication session can proceed smoothly.

As described above, the video balance can be changed through an operation on the on-communication video balance operation unit 7j. The video balance can be set to one of 'standard', 'fine', 'excellent', 'speedy', and 'more speedy'. The video balances 'fine' and 'excellent' can be achieved by decreasing a quantization threshold value so as to express moving picture images in a larger number of bits. On the other hand, the video balances 'speedy' and 'more speedy' can be achieved by increasing a quantization threshold value so as to express moving picture images in a smaller number of bits.

Figure 15:
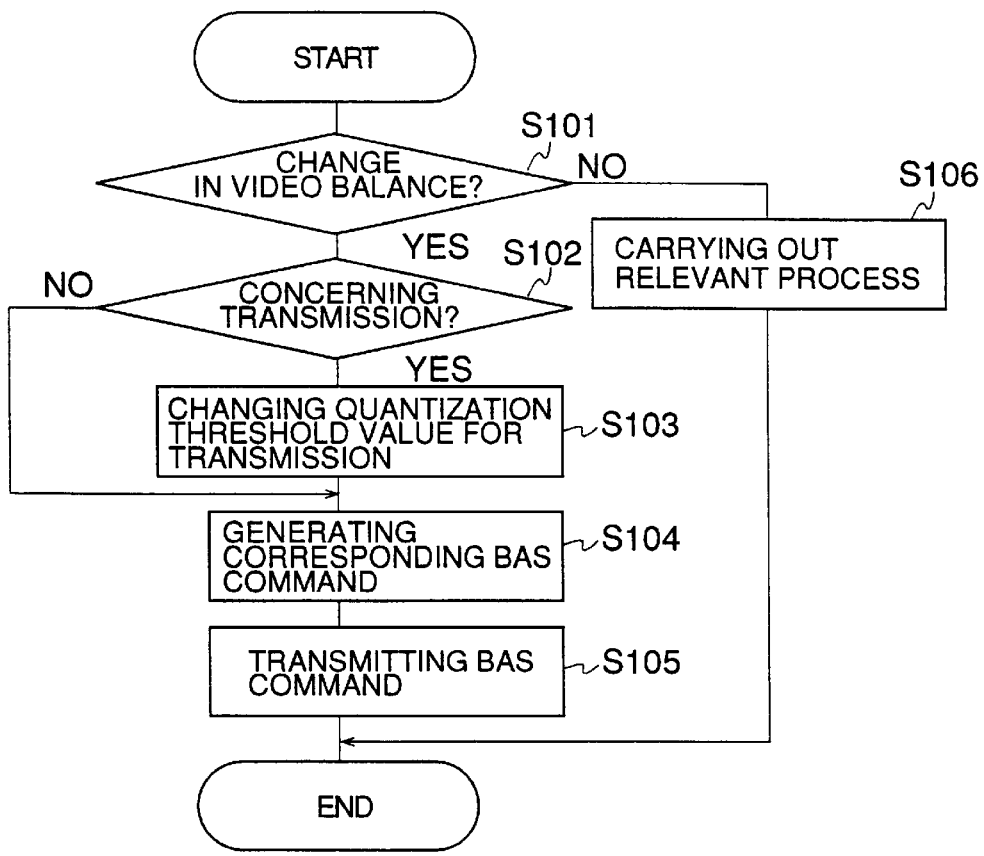
FIG. 15 is a flow chart of a first embodiment of a process of a system control unit of FIG. 2 according to the present invention, when a user requests a change in a video balance.

FIG. 15 shows a flow chart of a first embodiment of a process carried out by the system control unit 1 according to the present invention, when a user requests a change of the video balance through an operation on the operation display device 7.

At step S101, a check is made whether the operation key selected is one of the keys of the on-communication video balance operation unit 7j. If it is, a check is made whether a requested change of the video balance is concerned with moving picture images transmitted from the user's own terminal at a step S102.

If it is concerned with moving picture images transmitted from the user's own terminal, at a step S103, a quantization threshold value is selected as requested, and set in the coding part (for transmission) of the video CODEC 13.

At a step S104, the system control unit 1 generates a BAS command indicating the selected quantization threshold value to be used. At a step S105, the BAS command generated is transmitted. This is the end of the process. If an answer of the check made at the step S102 is negative, the procedure proceeds to the step S104 so as to set the requested video balance only for the remote terminal.

If it turns out that at the step S101 the operation key touched is not one of the keys of the on-communication video balance operation unit 7j, a process indicated by the operation key is carried out.

As described above, when a request is made for a change of the video balance with regard to the user's own terminal, the video CODEC 13 of the user's own terminal can be set according to the request from the user, while the video balance of moving picture images transmitted from a remote terminal is also set in accordance with the request. Thus, the video balances of both terminals can be set simultaneously, which can enhance the convenience of the operation.

Figure 16:
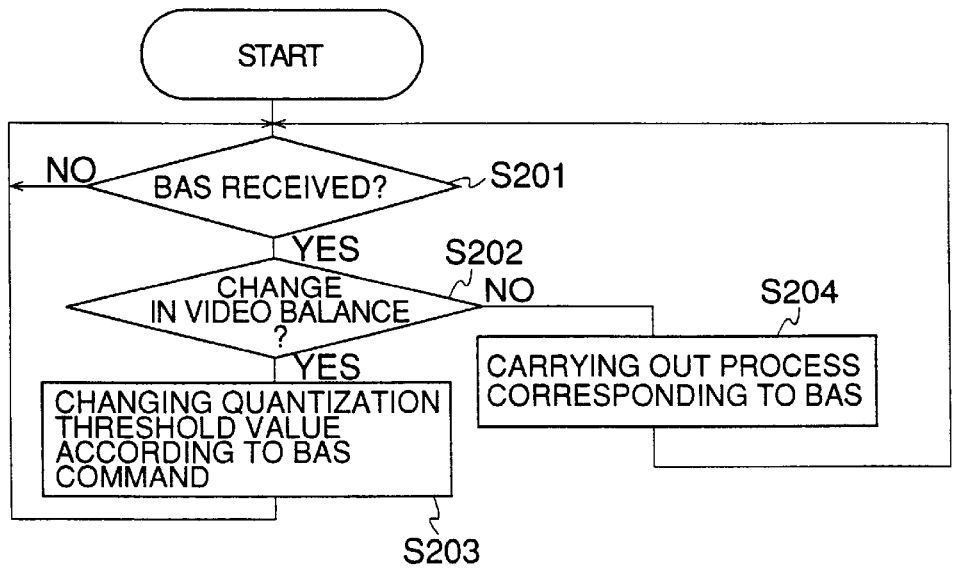
FIG. 16 is a flow chart of a first embodiment of a process of the system control unit according to the present invention, when the system control unit receives a BAS command.

FIG. 16 shows a flow chart of a first embodiment of a process of the system control unit 1 according to the present invention, when it receives a BAS command.

At a step S201, a check is made whether a BAS command is received. If it is not, the procedure goes back to the step S201, and repeats the same check.

If a BAS command is received, a check is made at a step S202 whether the received BAS command is concerned with a selection of moving-picture-image parameters.

If it is concerned with a selection of moving-picture-image parameters, a quantization threshold value indicated by the BAS command is set in the coding part (for transmission) of the video CODEC 13 at a step S203. Then, the procedure goes back to the step S201.

If the received BAS command is not concerned with a selection of moving-picture-image parameters, a process indicated by the BAS command is carried out, and the procedure goes back to the step S201.

In the embodiment described above, a quantization threshold value has been particularly used as a parameter for moving picture images. However, other parameters can also be indicated by a BAS command. One example of other parameters is a frame rate at which moving picture images are transmitted.

A frame rate has a certain relationship with a quantization threshold value, and there is a trade off between image quality and motion responsiveness when using a transmission line of a constant capacity. As noted above, when a quantization threshold value is set to a small value, a data amount of moving picture images increases. As a result, when the data amount exceeds the capacity of the transmission line, a frame rate of the moving picture images should be decreased. This means putting image quality ahead of motion responsiveness.

Similar effect can be observed by adjusting a frame rate instead of a quantization threshold value. Namely, decreasing a frame rate results in a larger data amount which can be allocated to one frame of moving picture images on a transmission line of a constant capacity. This means again putting image quality ahead of motion responsiveness.

Figure 17:
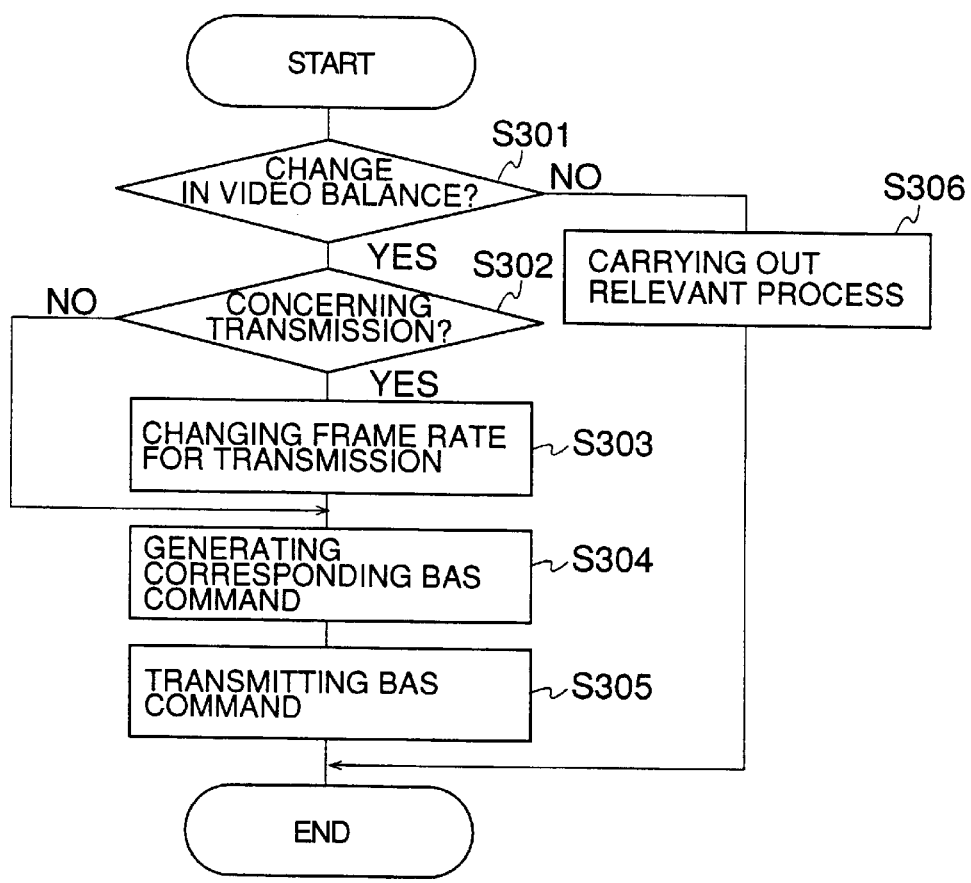
FIG. 17 is a flow chart of a second embodiment of a process of the system control unit according to the present invention, when a user requests a change in a video balance.

FIG. 17 shows a flow chart of a second embodiment of a process carried out by the system control unit 1 according to the present invention, when a user requests a change of the video balance through operating on the operation display device 7. In FIG. 16, the moving-picture-image parameter which can be adjusted is a frame rate instead of a quantization threshold value.

At step S301, a check is made whether the operation key touched is one of the keys of the on-communication video balance operation unit 7j. If it is, a check is made whether a requested change of the video balance is concerned with moving picture images transmitted from the user's own terminal at a step S302.

If it is concerned with moving picture images transmitted from the user's own terminal, at a step S303, a frame rate is selected as requested for the user's own terminal.

At a step S304, the system control unit 1 generates a BAS command indicating the selected frame rate to be used. At a step S305, the BAS command generated is transmitted. This is the end of the process. If an answer of the check made at the step S302 is negative, the procedure proceeds to the step S304 so as to set the requested video balance only for the remote terminal.

If it turns out that at the step S301 the operation key touched is not one of the keys of the on-communication video balance operation unit 7j, a process indicated by the operation key is carried out.

Figure 18:
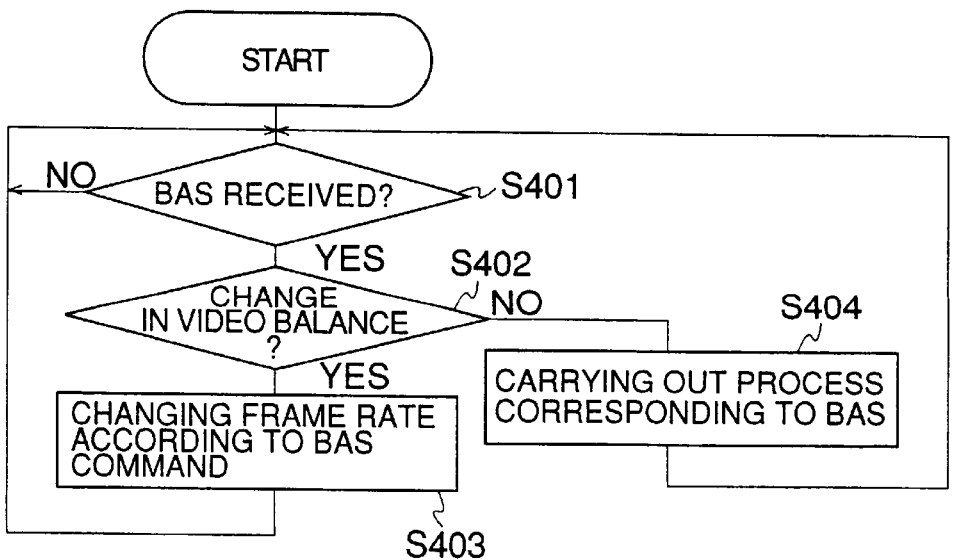
FIG. 18 is a flow chart of a second embodiment of a process of the system control unit according to the present invention, when the system control unit receives a BAS command.

FIG. 18 shows a flow chart of a second embodiment of a process of the system control unit 1 according to the present invention, when it receives a BAS command.

At a step S401, a check is made whether a BAS command is received. If it is not, the procedure goes back to the step S401, and repeats the same check.

If a BAS command is received, a check is made at a step S402 whether the received BAS command is concerned with a selection of moving-picture-image parameters.

If it is concerned with a selection of moving-picture-image parameters, a frame rate indicated by the BAS command is set in the coding part (for transmission) of the video CODEC 13 at a step S403. Then, the procedure goes back to the step S401.

If the received BAS command is not concerned with a selection of moving-picture-image parameters, a process indicated by the BAS command is carried out, and the procedure goes back to the step S401.

As described above, according to the present invention, a user of a TV conference communication device can set moving-picture-image parameters for a remote site to a desired image quality during a session of the TV conference communication. Thus, the user can obtain moving picture images sent from a remote site with the desired image quality. Also, the function of the multi-byte extension message, which can be used during a transmission control procedure, is employed in order to indicate the moving-picture-image parameters. Accordingly, there is no need to implement a new and specific-purpose function for a transmission control procedure, which means that the device can be produced at a low cost.

Further, the present invention is not limited to these embodiments, but various variations and modifications may be made without departing from the scope of the present invention.

What is claimed is:

1. A method of controlling TV conference communication devices having exchanges of moving picture images therebetween through a network, said method comprising the steps of:

a) sending first moving-picture-image parameters from one of said TV conference communication devices to at least another one of said TV conference communication devices during said exchanges, said first moving-picture-image parameters including information indicating quality of said moving picture images; and b) transmitting said moving picture images from said at least another one of said TV conference communication devices by using said first moving-picture-image parameters;

wherein said first moving-picture-image parameters comprise a quantization threshold value and said method farther comprises the steps of:

c) setting said quantization value to a first value for transmitting said moving picture images at a first speed with a first image quality;

d) setting said quantization value to a second value greater than said first value for transmitting said moving picture images at a second speed higher than said first speed with a second image quality lower than said first image quality;

e) setting said first and second values as a function of a user selecting at a control panel one of image quality settings and transmission speed settings at said one of said TV conference communication devices, wherein said first and second values comprise a video balance setting;

f) setting both said one of said TV conference communication devices and said at least another one of said TV conference communication devices with the video balance setting, if the user selects changing the video balance setting for a transmission from said one of said TV conference communication devices; and g) setting said at least another one of said TV conference communication devices with the video balance setting if the user selects changing the video balance setting for a reception from said at least another one of said TV conference communication devices.

2. The method as claimed in claim 1, wherein said network comprises ISDN (integrated services digital network).

3. The method as claimed in claim 1, further comprising a step of setting said first moving-picture-image parameters in a video coder/decoder unit of said at least another one of said TV conference communication devices.

4. The method as claimed in claim 3, further comprising a step of setting second moving-picture-image parameters in said TV conference communication devices before said exchanges, so that said exchange can be carried out based on said second moving-picture-image parameters before said first moving-picture-image parameters are used.

5. The method as claimed in claim 1, further comprising the steps of:

setting said first moving-picture-image parameters during said exchange in a video coder/decoder unit of said one of said TV conference communication devices so as to transmit said moving picture images by using said first moving-picture-image parameters.

6. The method as claimed in claim 5, further comprising a step of setting second moving-picture-image parameters in said TV conference communication devices before said exchanges, so that said exchange can be carried out based on said second moving-picture-image parameters before said first moving-picture-image parameters are used.

7. The method as claimed in claim 1, further comprising a step of setting second moving-picture-image parameters in said TV conference communication devices before said exchanges, so that said exchange can be carried out based on said second moving-picture-image parameters before said first moving-picture-image parameters are used.

8. The method as claimed in claim 7, wherein said network comprises ISDN (integrated services digital network).

9. The method of claim 1, wherein said step setting said first and second values comprises one of:

a user selecting at said control panel said image quality settings including one of a first image quality setting, a second image quality setting, and a third image quality setting; and a user selecting at said control panel said transmission speed settings include one of a first transmission speed setting, a second transmission speed setting, and a third transmission speed setting.

10. The method of claim 9, wherein said first image quality setting is lower in image quality than said second and third image quality settings, and said second image quality setting is lower in image quality than said third image quality setting; and wherein said first transmission speed setting is lower in transmission speed than said second and third transmission speed settings, and said second transmission speed setting is lower in transmission speed than said third transmission speed setting.

11. A TV conference communication device having exchanges of first moving picture images and second moving picture images with at least one of other TV conference communication devices, said TV conference communication device comprising:

an image pickup device picking up said first moving picture images regarding first participants at said TV conference communication device;

a monitor system showing said second moving picture images regarding second participants at said at least one of other TV conference communication devices;

an input device receiving an instruction during said exchanges from said first participants with regard to image quality of said second moving picture images; and a control device sending first moving-picture-image parameters to said at least one of other TV conference communication devices, wherein said first moving-picture-image parameters define said image quality so that said at least one of other IV conference communication devices can send said second moving picture images with said image quality; and wherein said first moving-picture-image parameters comprise a quantization threshold value and said control device sets said quantization value to a first value for transmitting said second moving picture images at a first speed with a first image quality, and said control device sets said quantization value to a second value greater than said fast value for transmitting said moving picture images at a second speed higher than said first speed with a second image quality lower than said first image quality; and said first and second values are set as a function of said first participants selecting at said input device one of image quality settings and transmission speed settings at said TV conference communication device, wherein said first and second values comprise a video balance setting;

said TV conference communication device and said at least one of other TV conference combination devices a set with the video balance setting, if said first participants select changing the video balance setting for a transmission from said TV conference communication device; and said at least one of other TV conference communication devices is set with the video balance setting, if said first participants select changing the video balance setting for a reception from said at least one of other TV conference communication devices.

12. The TV conference communication device as claimed in claim 11, wherein said control device sets second moving-picture-image parameters sent from said at least one of other TV conference communication devices, said second moving-picture-image parameters regarding image quality of said first moving picture images, so that said TV conference communication device can send said first moving picture images with said image quality.

13. The TV conference communication device as claimed in claim 12, wherein said first moving picture images, said second moving picture images, and said moving-picture-image parameters are exchanged through ISDN.

14. The TV conference communication device as claimed in claim 12, wherein said input device receives an instruction during said exchanges from said first participants with regard to image quality of said first moving picture images, and said control device changes said image quality of said first moving picture images.

15. The TV conference communication device as claimed in claim 12, wherein said input device can receive an instruction during said exchanges from said first participants with regard to image quality of both said first moving picture images and said second moving picture images.

16. The device according to claim 11, wherein said image quality settings include one of a first image quality setting, a second image quality setting, and a third image quality setting, and said transmission speed settings include one of a first transmission speed setting, a second transmission speed setting, and a third transmission speed setting.

17. The device according to claim 16, wherein said first image quality setting is lower in image quality than said second and third image quality settings, and said second image quality setting is lower in image quality than said third image quality setting; and wherein said first transmission speed setting is lower in transmission speed than said second and third transmission speed settings, and said second transmission speed setting is lower in transmission speed than said third transmission speed setting.

* * * * *